United States Patent [19]

Supcoe et al.

[11] 4,410,363
[45] Oct. 18, 1983

[54] UNDERWATER APPLICABLE ANTIFOULANT PAINT COMPOSITION

[75] Inventors: Robert F. Supcoe, Annapolis, Md.; Thomas Radakovich, Dequesne, Pa.; Stephen D. Rodgers, Bowie, Md.

[73] Assignee: The United States of America as represented by the Secretary of the Navy, Washington, D.C.

[21] Appl. No.: 285,663

[22] Filed: Jul. 21, 1981

[51] Int. Cl.$^3$ ............................................. C09D 5/08
[52] U.S. Cl. ............................... 106/18.29; 106/18.32; 106/18.35; 106/270; 106/272; 424/288
[58] Field of Search ................ 106/270, 272, 18.29, 106/18.35, 18.32; 424/288

[56] References Cited

U.S. PATENT DOCUMENTS

| 3,898,190 | 8/1975 | Willey | 106/272 |
| 4,025,698 | 5/1977 | Milne | 428/447 |
| 4,115,130 | 9/1978 | Crump et al. | 106/16 |
| 4,154,818 | 5/1979 | Kanada et al. | 106/15.05 |
| 4,186,026 | 1/1980 | Rotenberg et al. | 106/287.14 |
| 4,293,339 | 10/1981 | Supcoe et al. | 106/270 |
| 4,303,444 | 12/1981 | Warnez | 106/18.35 |

OTHER PUBLICATIONS

Hawley, *The Condensed Chem. Dictionary*, 9th Ed., 1977, pp. 19, 144, 773.

*Primary Examiner*—Lorenzo B. Hayes
*Attorney, Agent, or Firm*—R. F. Beers; L. A. Marsh

[57] ABSTRACT

This invention provides an underwater antifoulant coating that is of a paint-like viscosity and is applied to an underwater surface by brush and comprises a mixture of multiple chlorinated and/or fluorinated waxes, an antifoulant biocide, and a fumed silica utilized as a thickener and produces a viscosity of about 26.75 poises at 25° C., and a density of about 1.28.

1 Claim, No Drawings

UNDERWATER APPLICABLE ANTIFOULANT PAINT COMPOSITION

BACKGROUND OF THE INVENTION

1. Field of the Invention

This invention generally relates to coating materials and to improved antifouling coating compositions suitable for protecting underwater surfaces of ships from hard fouling and slime build-up.

2. Description of the Prior Art

Many antifouling paints, biocidal compositions, and related compositions have been developed recently in an effort to reduce toxicity, increase durability and wear, prevent pollution, and improve cost effectiveness to surfaces exposed substantially continuously to seawater, for example, U.S. Pat. Nos. 2,838,419; 3,806,352; 3,959,530; 4,115,130; and 4,154,818 illustrate various wax-based formulations. And, U.S. Pat. Nos. 4,025,693; and 4,186,026 show silicone based formulations useful in the area of surface protection underwater. However, few, if any, have the capability of being safisfactorily applied underwater thus avoiding costly dry docking for application of the coating material.

SUMMARY OF THE INVENTION

Applicants' invention overcomes the application problems of the prior art by providing a coating material for application to submerged surfaces in seawater comprising a mixture, by weight percent, of from about 6.0% to about 23.0% of a mixture chlorinated aliphatic wax polymers having a recurring unit of $-C_2C_4-$ and an average molecular weight range of between about 400 and about 1200; from about 22.0% to about 32.0% biocide, antifoulant, and about 1.0% to about 3.0% fumed silica as a thickener. Since the temperature of seawater affects the physical properties of antifouling compositions and formulations, it is necessary that the composition be easy to apply at varying seawater temperatures. Thus, the antifoulant must displace water molecules from the underwater surface and remain insoluble in seawater and remain sufficiently hard to provide a durable coating. Further, the antifoulant composition must provide good adhesion and affinity to the underwater surface and prevent sag and run-off after application and yet remain pliable during its life.

OBJECTS OF THE INVENTION

An object of this invention is to provide a coating formulation for use on an underwater surface when said surface is underwater.

Another object of this invention is to provide a coating formulation for use on an underwater surface when said surface is underwater that provides good adhesion and affinity to said surface, does not sag or run-off and remains pliable during its life.

Other objects and many of the attendant advantages will be readily appreciated as the same becomes better understood by reference to the following description and claims.

DETAILED DESCRIPTION OF THE INVENTION

The coating material for application to submerged surfaces of the invention comprises a mixture, by weight percent of from about 6.0% to about 23.0% of a mixture of chlorinated aliphatic wax polymers having a recurring unit of $-C_2C_4-$ and an average molecular weight range of between about 400 and about 1200; a biocidal antifoulant of from about 22.0% to about 32.0%; and a thickener of fumed silica of from about 1.0% to about 3.0%.

The fluorowaxes and chlorowaxes also are equally utilized in this invention. However, the cost of fluorowaxes and/or fluoro chloro mixtures makes the use of fluoro either alone or in combination substantially prohibitive.

Fumed silica is preferably used as a thixotropic agent to provide the preferred flow characteristics to the coating material.

The process for preparing fumed silica generally used is by the hydrolysis of silicon tetrachloride vapor in the presence of a catalyst; a combustion flame of hydrogen and oxygen gas, to wit:

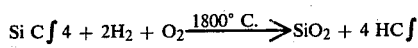

The small droplets of silicon dioxide ($SiO_2$) (eg. about 7–14 millimicrons in diameter) collide and fuse together to form branched, chain-like aggregates. As the fused aggregates cool below the fusion temperature, the silicon dioxide aggregates fuse together and become physically entangled to form agglomerates. During formation of the fumed silica particles, chemical groups become attached to some of the silicon atoms on the surface of the particles. These chemical groups include hydrophilic hydroxyl groups (—OH); hydrophilic hydrogen bonded hydroxyl groups (—$OH_2$—); and nonpolar siloxane groups (—O—).

The hydroxyl groups (—OH) attached to the surface silicon atoms are used to form hydrogen bonds between different aggregate particles and other hydrogen bonding substances such as alcohols, carbonyl compounds, ethers, etc. The hydrogen bonding characteristics provided by the hydroxyl groups provides a means for thixotropically thickening liquid suspensions by linking the aggregates together through hydrogen bonding. A thixotropic material, such as fumed silica, exhibits a decrease in viscosity as a shear stress is applied to the material and a subsequent viscosity increase when the shear force is eliminated. Factors affecting the efficiency of fumed silica as a thickening agent include the nature of the solution to which it is combined; the fumed silica concentration; the pH of the solution; and the presence of additives.

In non-hydrogen bonding and low hydrogen bonding systems fumed silica exhibits it greatest degree of hydrogen bonding with other fumed silica aggregates thereby producing the greatest degree of thickening and thixotropy. In these solutions the hydroxyl groups attached to the surface silica atoms have no competition from other substances to reduce their hydrogen bonding attraction for each other. Thus, the fumed silica aggregates orient themselves in the suspension to form a three-dimensional matrix of fumed silica aggregates. As a shear force is applied to the matrix, the aggregates are disrupted and the viscosity of the solution decreases. Upon removal of the shear force, the aggregates form hydrogen bonds to re-establish a matrix and the viscosity approaches its original value.

In high hydrogen bonding systems the capability of fumed silica aggregates to form hydrogen bonds with each other is lower than for the low hydrogen bonding systems since there is competition from other liquid molecules for attachment to the fumed silica hydroxyls. Generally, the viscosity of these fluid systems can be increased by increasing the concentration of the fumed silica.

Additives for fumed silica are herein defined as substances whose presence in comparatively small amounts produces a large effect on the flow characteristics of the system. In high hydrogen bonding liquids cationic surfactants are most useful in improving the thickening and thixotropic efficiency of fumed silica. The cationic surfactants modify and partially impede the interaction between the fumed silica hydroxyls and the solvent molecules, thereby allowing the fumed silica matrix structure to develop more completely. In medium to low hydrogen bonding systems, anionic surfactants and additives having short chain molecules with poly functional groups attached thereto act as bridging compounds between some of the surface hydroxyls of adjacent fumed silica aggregates, thereby forming chains consisting of alternating silica aggregates and other molecular constituents.

Properties of suitable fumed silica produced under the trade name Cab-O-Sil by Cabot Corporation, Boston, Massachusetts are set forth in the following table.

| | Surface Area (m²/gm) | | | | |
|---|---|---|---|---|---|
| Grade | 200 = 25 | 255 ± 15 | 325 ± 25 | 390 ± 40 | 400 ± 20 |
| M-5 | X | | | | |
| MS-7 | X | | | | |
| MS-75 | | X | | | |
| HS-5 | | | X | | |
| EH-5 | | | | X | |
| S-17 | | | | | X |

| | Density (lbs/ft³) | | pH (4% in H₂O) | | |
|---|---|---|---|---|---|
| Grade | 2.3 max. | 4.5 ± 0.5 | 3.5–4.2 | 3.6–4.2 | 3.6–4.2 |
| M-5 | X | | X | | |
| MS-7 | | X | | X | |
| MS-75 | | X | | X | |
| HS-5 | X | | | X | |
| EH-5 | X | | X | | |
| S-17 | | X | | | X |

All grades: Residue on 325 Mesh = 0.02% max.

| | Nominal Particle Size (Diameter in Microns) | | | | Ignition Loss (1000° C. moisture-free base) | | | |
|---|---|---|---|---|---|---|---|---|
| Grade | 0.014 | 0.011 | 0.008 | 0.007 | 1.0% | 1.5% | 2.0% | 2.5% |
| M-5 | X | | | | X | | | |
| MS-7 | X | | | | X | | | |
| MS-75 | | X | | | | X | | |
| HS-5 | | | X | | | | X | |
| EH-5 | | | X | | | | | X |
| S-17 | | | | X | | | | X |

All grades: Bulking Value = 5.5 gal./100 lbs.
Specific Gravity = 2.2
Color = White
Silica Content (ignited Sample) = >99.8%
Refractive Index = 1.46
X-ray Form = Amorphous The waxes which are used in the present formulations are generally characterized as being derivatives of petroleum. In broad terms, petroleum is characterized by the following types of hydrocarbons: paraffins, olefins, napthenes and aromatics. Paraffins are saturated, aliphatic (open-chain) hydrocarbons where the carbon atoms are linked together with single bonds. Distinct from the saturated open-chain hydrocarbons, olefins are unsaturated open-chain hydrocarbons since they are characterized by double and triple bonds between carbon atoms. Naphthenes are saturated hydrocarbons containing one or more ring structures and aromatic hydrocarbons are characterized by the presence of benzene rings. By appropriate distillation and separation techniques, the petroleum can be separated into these types of hydrocarbons in the form of various waxes, oils, solvents and residues.

The saturated aliphatic waxes may be characterized by their melting points and the processes by which they are derived and separated. For example, waxes derived from the wax-distillate fraction of crude petroleum and commonly referred to as paraffin waxes have molecules with average molecular weights of from about 260 to about 460 and having melting points which are usually between 120° F. and about 140° F. Higher melting point waxes, which are sold as microcrystalline, amorphous and heavy petroleum waxes, are usually derived from the heavy lubricating-oil fractions of the petroleum distillate. The microcrystalline waxes have molecules with average molecular weights of from about 400 to about 700 with from about 40 to 50 carbon atoms and melting points which are normally above 150° F.

As opposed to the low melting point paraffin waxes which tend to be somewhat brittle, microcrystalline waxes are tough and resist fracture. Addition of oil to the wax will tend to increase its plasticity. Microcrystalline waxes are generally compatible with other mineral and vegetable waxes and various resins. Thus, they are especially useful for increasing the hardness and melting point and for decreasing tack, sweating and other undesirable qualities of wax blends. For example, although paraffin waxes have serious shortcomings due to their high crystallinity and to the low intercrystalline forces bonding one crystal to another, the addition of microcrystalline waxes provides a means of modifying the functional properties of paraffin waxes by controlling the crystal size, the amount of amorphous intercrystalline material, the molecular weight and the transition point of the wax. Thus, the microcrystalline waxes as used in the present wax formulation serve a variety of functions, such as providing hardness and stability to the wax coating as well as intermixing with a variety of other materials.

| | PHYSICAL CHARACTERISTICS OF SOME MICROCRYSTALLINE WAXES | | | |
|---|---|---|---|---|
| | Brands | | | |
| Properties | Quaker State Microwax | Barnsdall Special Wax | Socony No. 2300 | Syncera Wax |
| Melting Point (°F.) | 145–146 | 160–165 | 155 | 155–160 |
| Specific Gravity (60° F.) | 0.09–0.92 | 0.92–0.94 | — | 0.912 |
| Specific Gravity (210° F.) | 0.78–0.80 | 0.80–0.82 | — | — |
| Viscosity at 210° F. (Saybolt) | 75–85 | 75–100 | 65 | 51 |
| Flash Point (°F.) | 500 min. | 500 min. | 495 | 425 |
| Fire Point (°F.) | 575 min. | 575 min. | 550 | — |
| Acid Number | 0.1 max | 0.1–0.2 | — | 0 |

Other constituents of the antifouling wax formulation are halogenated aliphatic waxes such as chlorowaxes and fluorowaxes or fluorolubes. The use of the halogenated waxes appears to modify the other paraffin and microcrystalline waxes so that the resulting matrix has an affinity for immersed application to underwater surfaces.

Fluorowaxes, hereinafter referred to as fluorolubes, are linear polymers built up of a recurring unit which is:

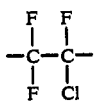

The terminal groups on each end of a chain are derived from the polymerization catalyst and/or the solvent. The fluorolubes, which are essentially fluorinated-chlorinated long chain saturated aliphatics, are stabilized by subjecting them to rigorous fluorination conditions wherein the terminal groups are fluorinated and any loosely held chlorine is replaced by fluorine. Although the fluorolubes are normally produced in an oil state, they can be prepared as greases in the form of silica-gel thickened oils. In general, fluorolubes are thermally stable up to about 260° C. and at about 300° C. depolymerization occurs. They are relatively insoluble in water, mineral acids and aqueous alkali solutions; slightly soluble in the lower alcohols; and generally soluble in petroleum base oils, benzene, ketones and most chlorinated materials. The high solubility with halogenated materials makes them especially useful as plasticizers for such compounds.

Properties of fluorolubes manufactured by the Process Chemicals Division, Hooker Chemicals and Plastics Corporation, Niagara Falls, N.Y. are as follows:

| Grade | A. OILS | | | | |
|---|---|---|---|---|---|
| | FS-5 | MO-10 | S-30 | T-80 | HO-12 |
| Viscosity, cp | | | | | |
| at 100° F. | 11 | 31 | 190 | 970 | 1460 |
| at 160° F. | 4.5 | 9 | 30 | 77 | 115 |
| Viscosity, cs | | | | | |
| at 100° F. | 6 | 16 | 100 | 500 | 750 |
| at 160° F. | 2.5 | 5 | 15 | 41 | 60 |
| Density (gm/cc) | | | | | |
| 100° F. | 1.868 | 1.895 | 1.927 | 1.945 | 1.953 |
| 160° F. | 1.812 | 1.840 | 1.876 | 1.893 | 1.902 |
| Pour Point (°F.) | −60 | −50 | 12 | 50 | 60 |

| B. GREASES | | | | |
|---|---|---|---|---|
| mm Penetration (ASTM D-217-48) | | | Dropping Point | |
| | 77° F. | 100° F. | 125° F. | (ASTM D-2265) |
| GR-290 | 239 | 250 | 270 | >450° F. |
| GR-362 | 263 | 269 | 273 | >450° F. |
| GR-470 | 183 | 185 | 190 | >450° F. |
| GR-544 | 267 | 285 | 300 | >450° F. |

| | Shear Stability (at 77° F.) Worked Penetration in mm | | |
|---|---|---|---|
| | 60 strokes | 500 strokes | 1000 strokes |
| GR-290 | 245 | 252 | 255 |
| GR-362 | 267 | 256 | 263 |
| GR-470 | 178 | 180 | 181 |
| GR-544 | 258 | 265 | 267 |

Chlorinated waxes, hereinafter referred to as chlorowaxes, may be described as chlorinated aliphatic saturated hydrocarbons which include molecules having from 10 to 30 carbon atoms. The properties of a particular commercial chlorowax depend on the following factors: (a) the nature of the raw material; (b) the chlorine content; and (c) the conditions of manufacture, such as the temperature of chlorination. Chlorowaxes are generally produced by passing gaseous chlorine into a paraffinic hydrocarbon at a temperature at which the viscosity of the paraffin is sufficiently low to permit free evolution of hydrogen chloride and solution of the chlorine. Although catalysts are not generally used, some production processes employ a solvents such as carbon tetrachloride and hexachlorobutadiene. The chlorine content will normally range from 40% to 70% although chlorowaxes designed for particular purposes have been prepared in which the chlorine contents were less than 40% and, conversely, greater than 70%. Chlorowaxes are insoluble in water and the lower alcohols but readily form emulsions with water in the presence of a suitable emulsifying agent. Chlorowaxes with chlorine contents greater than about 40% are soluble in mineral and lubricating oils, benzene, chlorinated solvents, ether, ketones, and esters. The commercially marketed chlorowaxes are usually designated by a trade name, followed by a number indicating the chlorine content, eg. Chlorowax (trademark of Diamond Shamrock Co.) 40, Cereclor (trademark of Imperial Chemical Industries, Ltd.) 70.

To improve the displacement of the water molecules and promote further adhesion of the wax material with the substrate, anionic surfactants may also be used. Examples of surfactants include naturally derived soaps, synthetic alkyl benzene sulfonates, and sulfonated fatty alcohols. However, although thousands of surfactants are presently being used to wet, foam, penetrate, emulsify, solubilize and/or disperse a selected material, there does not appear to be a universal surfactant. For example, Sarkosyl surfactants, as made by CIBA-GEIGY find particular application in the present wax formulation and they are made by reacting sarcosine, an N-methyl derivative of glycine ($NH_2CH_2COOH$, an amino acid), with fatty acid chlorides to yield a polar molecule in which the C-N-C amide linkage is interposed between the hydrophobic hydrocarbon chain and the hydrophilic carboxy group. This interposition of the amide bond is a characteristic of the Sarkosyl family and makes them very stable to acids and alkalies. They are also highly resistant to water hardness and metallic salts, biologically safe, and intermix well with the paraffin and refined waxes as well as with the halogenated waxes.

To the above mixtures of paraffin and defined waxes, halogenated waxes, and surfactants are added compatible amounts of antifoulants and biocides. A wide variety of biocides, as for example those disclosed in U.S. Pat. No. 4,020,200, are compatible with the abovementioned constituents. Biocidal compounds which can also be added to the wax mixture and are effective against marine growth include metal compounds, such as those containing tin, copper, zinc, nickel, cobalt, manganese or mercury, and organic compounds having an active structure containing sulfur, chlorine, nitrogen and oxygen atoms. Among the most effective biocidal compounds for preventing marine growth on underwater surfaces are copper compounds, such as cuprous oxide, and the organo-tin compounds.

Applicants preferable biocide used in this invention is Nopcocide N-96 made by Diamond Shamrock. It has an empirical formula $C_8C_4N_2$ and has a benzene type structure and a molecular weight of 265. Its chemical name is 2,4,5,6-Tetrachloroisophthalonitrile. It has a melting point of about 250° C., a boiling point of about 350° C. and a specific gravity of 1.8. It is noncorrosive and is thermally stable under normal storage temperatures. Application and durability was excellent.

EXAMPLE 1

One composition capable of excellent underwater application in accordance with this invention comprises a mixture of Chlorowax by weight consisting of 6-10%, 70% chlorine content Chlorowax (liquid paraffinic) (80 poise) 1.56; 20-26%, 70% chlorine content Chlorowax (liquid paraffinic) (1000 poise) 1.55; 18-23%, 60 chlorine content Chlorowax (liquid paraffinic) (20 poise) 1.36; and 21-26%, 40% chlorine content Chlorowax (liquid paraffinic) (2 poise) 1.13; a biocide, Nococide N96 at 23.99%; and a 1.8% fumed silica. The final composition has a viscosity of 26.75 poises at 25° C. and a density of 1.28. The Chlorowaxes used in the example are as follows:

| | DIABLO 700-X | |
|---|---|---|
| (a) | Color (Gardner Scale 1933) | 2 |
| | Viscosity | |
| | Poise 25° C. (Brookfield Viscometer) | 80 |
| | Saybolt Universal Seconds 210° F. | 75 |
| | Saybolt Universal Seconds 100° F. | 4500 |
| | Specific Gravity 25° C./25° C. | 1.56 |
| | Weight (pounds per gallon) | 12.9 |
| | Chlorine Content (percent) | 69 |
| | CHLOROWAX 70-L | |
| (b) | Color (Gardner Scale 1933) | 2 |
| | Viscosity | |
| | Poise 25° C. (Brookfield Viscometer) | 10,000 |
| | Saybolt Universal Seconds 210° F. | 400 |
| | Specific Gravity 25° C./25° C. | 1.55 |
| | Chlorine Content (percent) | 69 |
| | CHLOROWAX 500-C | |
| (c) | Color (Gardner Scale 1933) | 1 |
| | Viscosity | |
| | Poise 25° C. (Brookfield Viscometer) | 20 |
| | Poises 25° C. (Brookfield Viscometer) | 20 |
| | Gardner Holdt (Bubble tubes) 25° C. | X-Y |
| | Saybolt Universal Seconds 210° F. | 65 |
| | Saybolt Universal Seconds 100° F. | 1500 |
| | Specific Gravity 25° C./25° C. | 1.35 |
| | Weight (pounds per gallon) | 11.26 |
| | Bulking Value (gallons per pound) | 0.089 |
| | Refractive Index | 1.516 |
| | Heat Stability | 0.20 |
| | Chlorine Content (percent) | 59 |
| | Molecular Weight | 415 |
| | Surface Tension dynes/cm @ 25° C. | 40 |
| | Thermal Conductivity Cal/cm/sec° C. | $2.3 \times 10^{-4}$ |
| | CHLOROWAX 100 | |
| (d) | Color (Gardner Scale 1933) | 2 |
| | Viscosity | |
| | Poise 25° C. (Brookfield Viscometer) | 3 |
| | Gardner Holdt (Bubble tubes) 25° C. | J |
| | Specific Gravity 25°C./25° C. | 1.125 |
| | Heat Stability (% HCl, 4 hrs. @ 175° C.) | 0.25 |

-continued

| | | |
|---|---|---|
| Chlorine Content (percent) | | 40 |
| Specific Heat cal/gm/°C. | (@ 40° C.) | 0.3 |
| | (@ 90° C.) | 0.4 |

Alternate formulation fluorolube GR 740 silica thickened fluorinated paraffin is substituted for (b), above and showed excellent underwater application.

Obviously many modifications to this invention are possible in light of the above teachings. It is therefore to be understood that within the scope of the appended claims the invention may be practiced otherwise than specifically described.

What is claimed is:

1. A wax-based antifoulant coating for application to submerged surfaces consisting of a mixture, by weight percent, of
   (a) from about 6.0% to about 75.0% of a mixture of chlorinated aliphatic wax polymers having a recurring unit of $C_2Cl_4$ and an average molecular weight range of between about 400 to about 1200 wherein said mixture of chlorinated aliphatic wax polymers, by weight percent consist of from:
     (i) about 6.0% to about 10.0% of on aliphatic liquid wax polymer having a chlorine content, by weight percent, of from about 68.0% to about 72.0%;
     (ii) about 22.0% to about 26.0% of on aliphatic resinous wax polymer having a chlorine content, by weight percent, of from about 68.0% to about 72.0%;
     (iii) about 19.0% to about 23.0% of on aliphatic liquid wax polymer having a chlorine content, by weight percent, of from about 58.0% to about 62.0%; and
     (iv) about 19.0% to about 23.0% of on aliphatic liquid wax polymer having a chlorine content, by weight percent, of from about 38.0% to about 42.0%
   (b) from about 22.0% to about 26.0% of a biocide antifoulant for preventing marine growth selected from the group consisting of cuprous oxide, organo-tin compounds, and 2,4,5,6-tetrachloroisophthalonitrile; and
   (c) from about 1.0% to about 3.0% of a fumed silica thixotropic agent having a particle size of from about 7 to about 14 millimicrons in diameter.

* * * * *